(12) United States Patent
Davis et al.

(10) Patent No.: US 7,433,914 B2
(45) Date of Patent: Oct. 7, 2008

(54) AGGREGATING SERVICE PROCESSORS AS A CLUSTER

(75) Inventors: Brad A. Davis, Lake Oswego, OR (US); Henry J. DiVincenzo, Happy Valley, OR (US); Richard A. Lary, Tualatin, OR (US); Thomas E. Malone, Tigard, OR (US); Patrick D. Mason, Olympia, WA (US); Lee G. Rosenbaum, Portland, OR (US); Manoj R. Sastry, Portland, OR (US); Patrick W. White, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 09/952,333

(22) Filed: Sep. 13, 2001

(65) Prior Publication Data

US 2003/0050992 A1   Mar. 13, 2003

(51) Int. Cl.
*G06F 15/16* (2006.01)
(52) U.S. Cl. ...................... 709/201; 709/221
(58) Field of Classification Search ............ 709/205, 709/213; 370/390; 714/4
See application file for complete search history.

(56) References Cited

U.S. PATENT DOCUMENTS

| | | | | |
|---|---|---|---|---|
| 5,341,477 A | * | 8/1994 | Pitkin et al. | 709/226 |
| 5,809,505 A | * | 9/1998 | Lo et al. | 707/102 |
| 6,189,111 B1 | * | 2/2001 | Alexander et al. | 714/8 |
| 6,243,825 B1 | * | 6/2001 | Gamache et al. | 709/228 |
| 6,292,905 B1 | * | 9/2001 | Wallach et al. | 714/4 |
| 6,389,551 B1 | * | 5/2002 | Yount | 714/4 |
| 6,415,323 B1 | * | 7/2002 | McCanne et al. | 709/225 |
| 6,665,304 B2 | * | 12/2003 | Beck et al. | 370/401 |
| 6,721,907 B2 | * | 4/2004 | Earl | 714/57 |
| 6,834,298 B1 | * | 12/2004 | Singer et al. | 709/220 |
| 2002/0016813 A1 | * | 2/2002 | Woods et al. | 709/107 |
| 2002/0075870 A1 | * | 6/2002 | de Azevado et al. | 370/390 |
| 2003/0050992 A1 | * | 3/2003 | Davis et al. | 709/213 |
| 2003/0050993 A1 | * | 3/2003 | Davis et al. | 709/213 |

OTHER PUBLICATIONS

Computer desktop encyclopedia entry of "console," copyright 1981-2005, The Computer Language Company Inc., version 18.4, 4th quarter 2005.
IBM Technical White Paper, "The IBM @eserver pSeries 690," Sep. 2001, available at www.ibm.com.

\* cited by examiner

*Primary Examiner*—Patrice Winder
(74) *Attorney, Agent, or Firm*—Abdy Raissinia (57) ABSTRACT

The self-clustering of service processors within a system is disclosed. The system can also include an operating system or other software code, a management console, or both. The operating system communicates with the cluster of service processors, where the service processors are self-clustered or otherwise, such as through a memory shared by at least all the service processors. The operating system therefore need not be aware which of the service processors performs a given function. The console communicates with the cluster of service processors, where the service processors are self-clustered or otherwise, through any service processor of the cluster. The console therefore also need not be aware that the service processors have been clustered to perform functionality for the console.

14 Claims, 11 Drawing Sheets

AGGREGATING SERVICE PROCESSORS AS A CLUSTER

BACKGROUND OF THE INVENTION

1. Technical Field

This invention relates generally to service processors as may be found within nodes of a system, and more particularly to the self-clustering of such service processors, so that, for instance, a single image of the service processors appears to the operating system of the system and/or a management console for the system.

2. Description of the Prior Art

As computer systems, such as server systems, become more complex, they have been divided into different nodes that operate as separate units. Each node may have its own processors, memory, and input/output (I/O) modules. Functionality performed by a system may be divided among its various nodes, such that each node is responsible for one or more different functions. Each node has a service processor (SP) that functions independently of the service processors of the other nodes, but which allows external access to the hardware of its node.

A complication to dividing a system into different nodes is that the operating system (OS) running collectively on the system, and the management consoles used to manage the system externally, have traditionally had to be aware of the specific aspects of this division into nodes. The operating system, for instance, has to know which service processor is responsible for which hardware and functionality of the system, so that messages can be routed to the appropriate service processor. Similarly, management consoles have to know the mapping of the service processors to the system's hardware and functionality.

This adds increased complexity to the operating system and the management consoles. Significant configuration may have to be accomplished to ensure that the operating system and the consoles are properly aware of the different service processors and the functions that have been assigned to them. Furthermore, like all system components, service processors sometimes fail. To ensure that the system itself does not fail, another service processor may have to temporarily act as the failover service processor for the down service processor. The operating system and the consoles must be aware of such failover procedures, too. Load balancing and other inter-service processor procedures also require knowledge of the distribution of functionality over the service processors.

In addition, traditional communication between an operating system and the service processors of the system occurs within the firmware of the system. Firmware is software that is stored in hardware, such that the software is retained even after no power is applied to the hardware. The use of conventional firmware, however, degrades performance significantly. For instance, firmware is not re-entrant. That is, only one service processor can execute the firmware at a single time. This means that the firmware may present a bottleneck to the efficient running of the system.

In other contexts, the management of multiple resources is accomplished on a simplistic basis. For example, in the context of storage devices, such as hard disk drives, a redundant array of information disks (RAID) provides for limited interaction among resources. A RAID may be configured so that each hard drive redundantly stores the same information, that data is striped across the hard drives of the array for increased storage and performance, or for additional or other purposes. However, the drives themselves do not actively participate in their aggregation. Rather, a master controller is responsible for managing the drives, such that the drives themselves are not aware of one another.

Therefore, such solutions are not particularly apt in the system division of functionality and hardware over multiple service processors scenario that has been described. For example, having a master controller in this scenario just shifts the burden of knowing the functionality and hardware division from the management consoles and the operating systems to the controller. This does not reduce complexity, and likely does not prevent reductions in system performance.

Other seemingly analogous resource management approaches have similar pitfalls. Network adapters that can be aggregated to provide greater bandwidth, for instance, are typically aggregated not among themselves, but by a host operating system and/or device driver. This host operating system and/or device driver thus still takes on the complex management duties that result when multiple resources are managed as a single resource. In other words, complexity is still not reduced, and potential performance degradation is still not prevented.

For these described reasons, as well as other reasons, there is a need for the present invention.

SUMMARY OF THE INVENTION

The invention relates to service processors within a system. In a first method of the invention, each service processor self-discovers all the other service processors, such that the service processors are aggregated as a cluster. Each service processor maintains an object map that represents the hardware of the system for which it is responsible as objects. A first identifier and a second identifier uniquely identify each object. The first identifier corresponds to the service processor on which the object resides, whereas the second identifier distinguishes the object from other objects also residing on the service processor.

A first system of the invention includes a self-aggregated cluster of service processors, and either an operating system or other software code, a console, or both. The operating system communicates with the cluster of service processors such that it need not be aware which of the service processors performs a given function. The console communicates with the cluster of service processors through any service processor of the cluster. The console thus also need not be aware that the service processors have been clustered to perform functionality for the console.

A first article of manufacture of the invention includes a computer-readable medium and means in the medium. The means is for a service processor of a system self-discovering all the other service processors of the system to aggregate the service processors as a cluster. The means is further for the service processor maintaining an object map representing the hardware of the system for which it is responsible as objects.

A second system of the invention includes an aggregated cluster of service processors, and software code that communicates with the cluster such that the software code need not be aware which of the service processors performs a given function. A second method of the invention includes aggregating service processors together as a cluster, and communicating by software code within the cluster such that the code need not be aware which of the service processors performs a given function. A third article of manufacture of the invention includes a computer-readable medium, and means in the medium. The means is for communicating by software code with service processors aggregated as a cluster, such that the code need not be aware which of the service processors performs a given function.

A third system of the invention includes an aggregated cluster of service processors, and software code that communicates with the cluster through a memory shared by all the service processors, such that the code need not be aware which of the service processors performs a given function. A third method of the invention includes aggregating service processors together as a cluster, and communicating by software code with the cluster through a memory shared by host processors and all the service processors, such that the code need not be aware which of the service processors performs a given function. A third article of manufacture of the invention includes a computer-readable medium, and means in the medium. The means is for communicating by software code with service processors aggregated as a cluster through a memory shared by processors and the service processors, such that the code need not be aware which of the service processors performs a given function.

A fourth system of the invention includes an aggregated cluster of service processors, and a console communicating with the cluster through any one service processor of the cluster, such that the console need not be aware that the service processors have been clustered to perform functionality for the console. A fourth method of the invention includes aggregating service processors together as a cluster, and communicating by a console with the cluster through any one service processor, such that the console need not be aware that the service processors have been clustered to perform functionality for the console. A fourth article of manufacture for the console includes a computer-readable medium, and means in the medium. The means is for communicating by a console with a cluster of service processors through any one service processor, such that the console need not be aware that the service processors have been clustered to perform functionality for the console.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
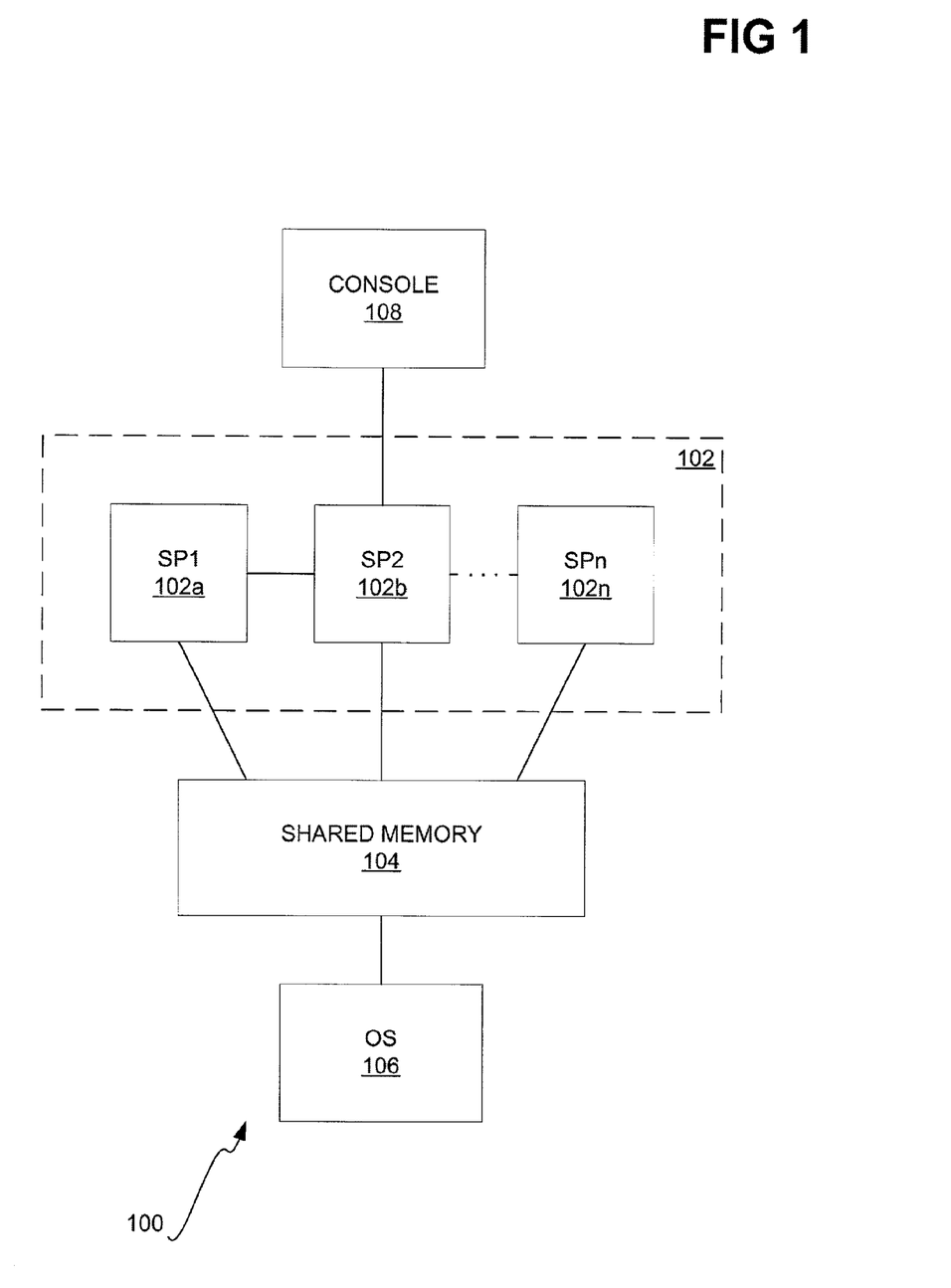
FIG. 1 is a diagram of a system according to a preferred embodiment of the invention, and is suggested for printing on the first page of the issued patent.

In the preferred embodiment of the invention, a number of service processors are self-aggregated together in a single cluster. FIG. 1 shows a system 100 in which the service processors 102*a*, 102*b*, . . . , 102*n* have been self-aggregated together in a single cluster, or complex, 102. The service processors 102*a*, 102*b*, . . . , 102*n* may be the processors of the computing nodes of the system 100 (not specifically shown in FIG. 1), in which each computing node includes varying hardware of the system 100. The service processors 102*a*, 102*b*, . . . , 102*n* are self-clustered in that no controller, host, or other entity is responsible for their clustering. Rather, the service processors 102*a*, 102*b*, . . . , 102*n* discover themselves on their own to form the cluster 102.

The service processors 102*a*, 102*b*, . . . , 102*n* appear as a single cluster 102 to an operating system (OS) 106 and a management console 108. For instance, with respect to the OS 106, the cluster 102 communicates with the OS 106 through a shared memory 104. The memory 104 is shared by all the service processors 102*a*, 102*b*, . . . , 102*n* within the cluster 102, as well as by other, non-service, processors, such as host processors. Communication between the cluster 102 and the OS 106 is such that the OS 106 is preferably unaware which of the service processors 102*a*, 102*b*, . . . , 102*n* performs a given function. For example, the OS 106 may place a message in a part of the memory 104 allocated for a certain function, such that the one of the service processors 102*a*, 102*b*, . . . , 102*n* responsible for this function monitors this part of the memory 104 and processes the message.

With respect to the console 108, the console 108 preferably communicates through any one of the service processors 102*a*, 102*b*, . . . , 102*n* of the cluster 102. As shown in FIG. 1, this is the service processor 102*b*. The service processor 102*b* determines whether a message received from the console 108 is intended for one of the other service processors of the cluster 102, or for itself, and routes the message accordingly. The console 108 is thus preferably unaware that the service processors 102*a*, 102*b*, . . . , 102*n* have been clustered as the cluster 102 to perform functionality for the console 108. All communication between the console 108 and the cluster 102 is preferably handled through the service processor 102*b*.

Technical Background

Figure 2:
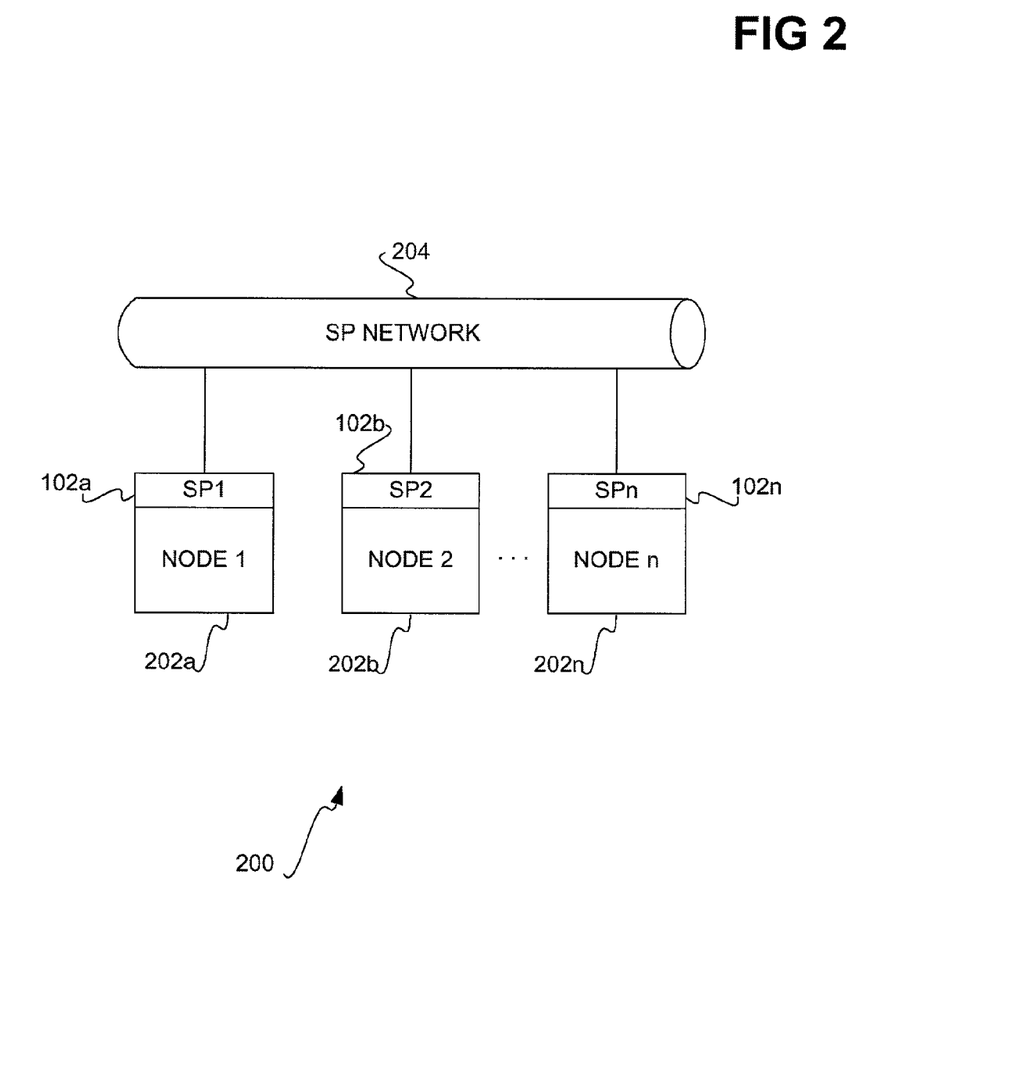
FIG. 2 is a diagram of a system including a number of service processors communicating with one another over a service processor network, in conjunction with which embodiments of the invention can be implemented.

FIG. 2 shows a system 200 of a number of computing nodes 202*a*, 202*b*, . . . , 202*n*, containing service processors 102*a*, 102*b*, . . . , 102*n*, that communicate with one another over a service processor network 204. The nodes 202*a*, 202*b*, . . . , 202n include hardware that make up the system 200, and by which the nodes 202a, 202b, ..., 202n perform functionality within the system 200. The service processors 102a, 102b, ..., 102n, and more specifically the firmware thereof, manage the performance of this functionality. Firmware is software that is stored in hardware, such that the software is retained even after no power is applied to the hardware. The network 204 may be an Ethernet network, or another type of network. The firmware of the service processors 102a, 102b, ..., 102n, of the computing nodes 202a, 202b, ..., 202n, respectively, handles communication to and from the network 204.

Figure 3:
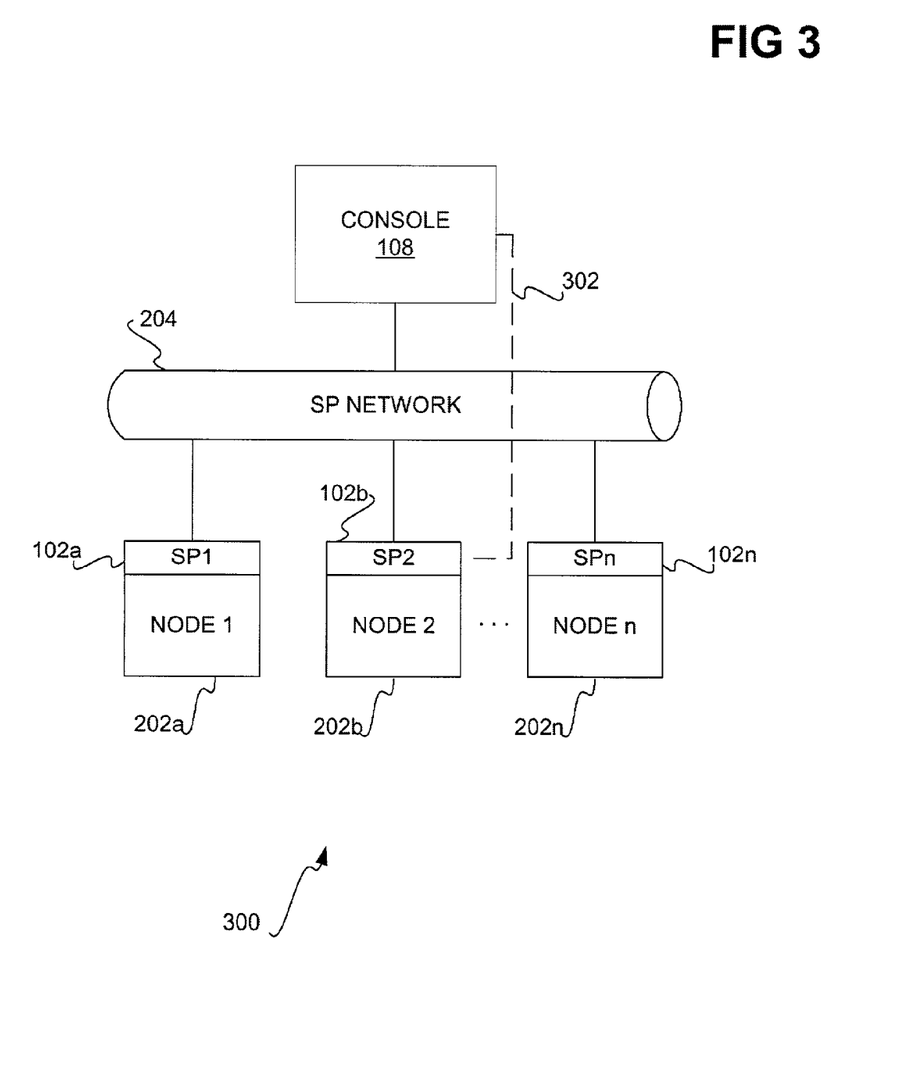
FIG. 3 is a diagram of the system of FIG. 2 with the addition of a management console, in conjunction with which embodiments of the invention can be implemented.

FIG. 3 shows a system 300 in which the management console 108 communicates with the service processor 102b of the node 202b. The console 108 may be, for instance, a desktop computer. The console 108 communicates with the service processor 102b over the network 204. However, the console 108 is only aware of the service processor 102b. For instance, the console 108 may only know the network address of the service processor 102b. Therefore, the console 108 only communicates with the service processor 102b, as indicated by the dotted line 302, even though it is communicatively connected to the network 204 over which all the service processors 102a, 102b, ..., 102n communicate.

Figure 4:
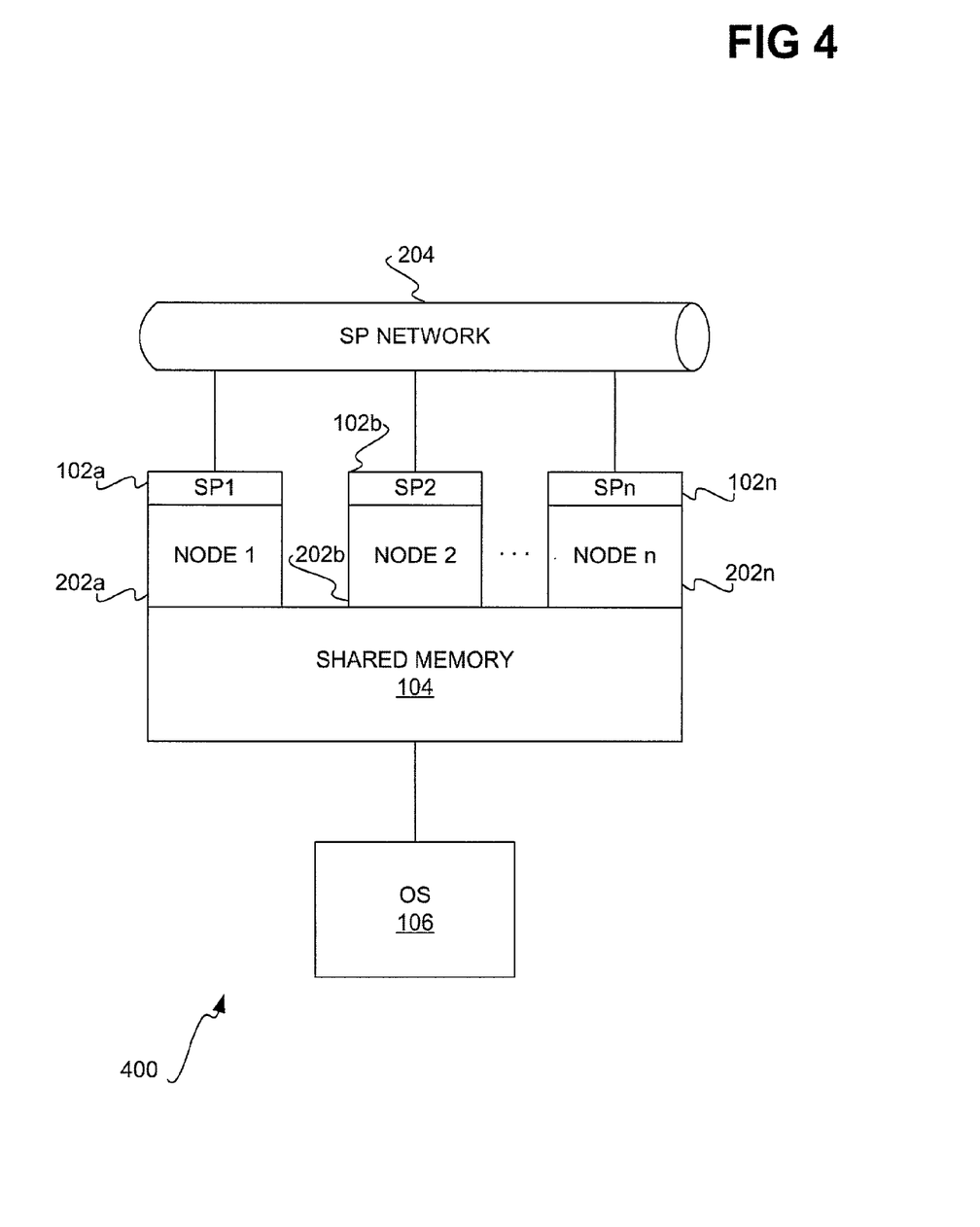
FIG. 4 is a diagram of the system of FIG. 2 with the addition of shared memory and an operating system, in conjunction with which embodiments of the invention can be implemented.

FIG. 4 shows a system 400 in which the operating system (OS) 106 communicates with the service processors 102a, 102b, ..., 102n through the shared memory 104. The shared memory 104 is shown as accessible to all the nodes 202a, 202b, ..., 202n, and thus to all the service processors 102a, 102b, ..., 102n of these nodes. The shared memory 104 may be the memory of one or more of the nodes 202a, 202b, ..., 202n. The service processors 102a, 102b, ..., 102n of the nodes 202a, 202b, 202n access the shared memory 104 through the nodes' memory interconnect.

Self-Clustering of Service Processors

Figure 5:
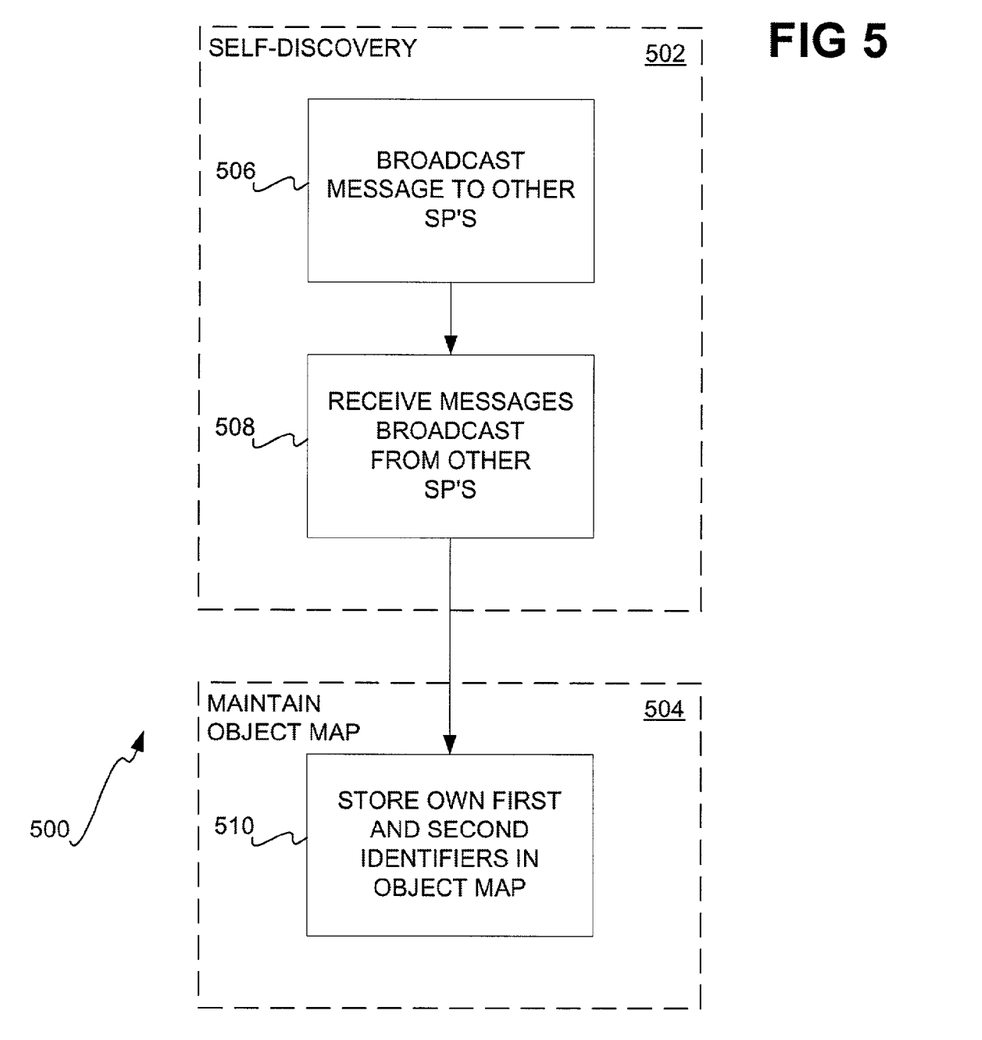
FIG. 5 is a flowchart of a method showing how service processors can self-cluster with one another, according to an embodiment of the invention.

FIG. 5 shows a method 500 of an embodiment by which service processors self-aggregate as a single cluster or complex. The method 500 can be implemented in conjunction with the systems 100, 200, 300, and 400 of FIGS. 1, 2, 3, and 4, respectively. The method 500 can also be implemented in conjunction with an article of manufacture having a computer-readable signal-bearing medium. The medium may be a recordable data storage medium.

The service processors first self-discover one another (502), such that the service processors are aggregated as a cluster. Each service processor also maintains an object map representing the hardware of the system for which it is responsible as objects (504). Two identifiers uniquely identify each object. The first identifier corresponds to the service processor on which the object resides. The second identifier distinguishes the object from other objects residing on the same service processor.

Figure 6:
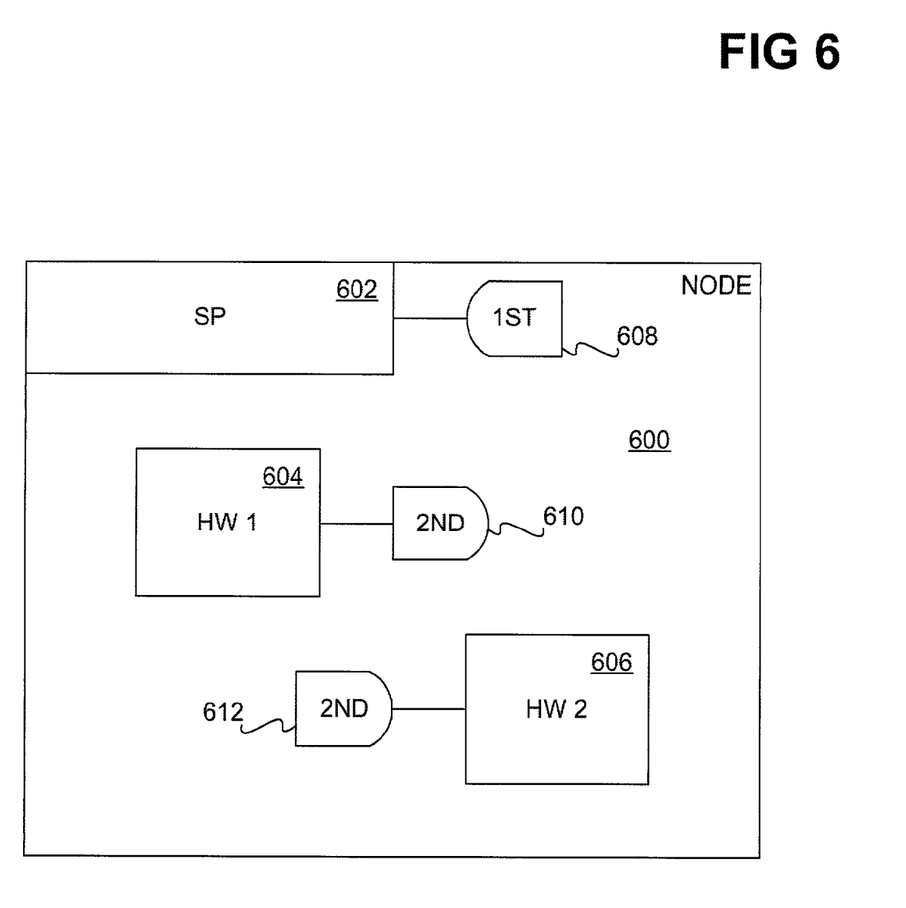
FIG. 6 is a diagram showing first and second identifiers of an example node.

FIG. 6 shows diagrammatically the difference between these two identifiers. Within an example node 600, there is a service processor 602, and two pieces of hardware, a first hardware 604 and a second hardware 606. The first identifier 608 identifies the service processor 602. The second identifier 610 is associated with the object representing the first hardware 604, whereas the second identifier 612 is associated with the object representing the second hardware 606. Thus, the combination of the first identifier 608 and either the second identifier 610 or the second identifier 612 uniquely identifies the service processor 602 and a specific object instance uniquely identifying either the hardware 604 or 606. For example, the combination of the first identifier 608 and the second identifier 610 uniquely identifies the service processor 602 as storing the object specifically representing the hardware 604.

The first identifier 608 may be any identifier unique to the service processor 602, such as the service processor's serial number or its Ethernet address. Other unique identifiers include combinations of one or more of the media access controller (MAC) address of the service processor 602, and the port over which the service processor 602 communicates. The first identifier 608 may or may not include a network-related unique identifier. The second identifiers 610 and 612 may be the object instance numbers of the objects instantiated to represent the hardware 604 and 606, respectively. For example, if the object representing the hardware 604 is initiated first, it may have an instance number of one, whereas if the object representing the hardware 606 is instantiated second, it may have an instance number of two.

Figure 7:
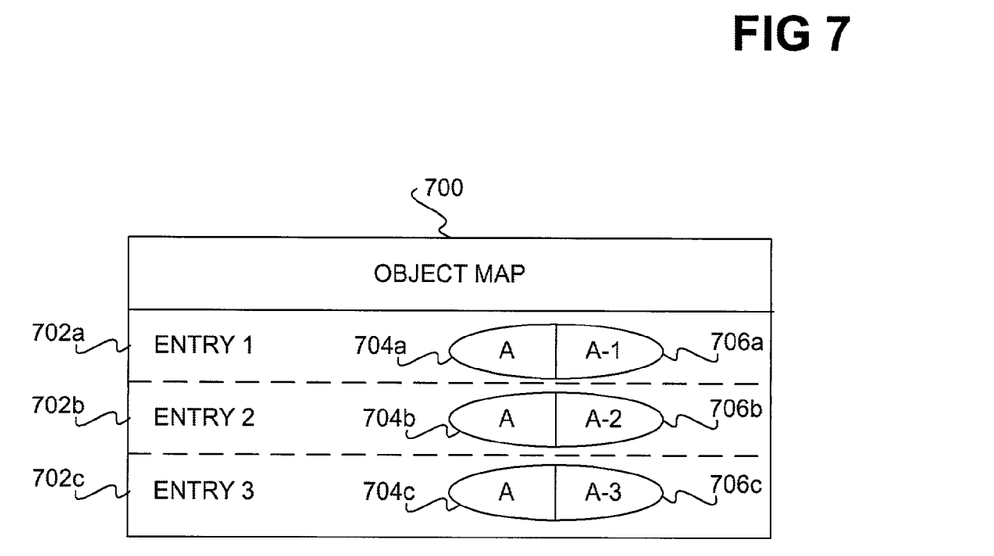
FIG. 7 is a diagram showing an example object map in which first and second identifiers are stored.

FIG. 7 shows diagrammatically an example object map 700 that is stored on a given service processor. The object map 700 includes entries 702a, 702b, and 702c. Each of these entries identifies an object with a first identifier indicating the service processor on which the object is stored, which is the service processor storing the map 700, and a second identifier distinguishing the object from other objects stored on this service processor. For example, entries 702a, 702b, and 702c have first identifiers 704a, 704b, and 704c, respectively, that identify a service processor "A," which is the service processor storing the map 700. However, these entries have second identifiers 706a, 706b, and 706c, respectively, that identify different object instances "A-1," "A-2," and "A-3" that represent different hardware on the same node as the service processor "A." Each service processor thus maintains an object map for the objects that are stored on the service processor. In this way, a global object map is distributed among all the service processors, where each service processor's own object map represents a part of the global object map.

Referring back to FIG. 5, self-discovery can specifically be performed by each service processor broadcasting a message to all the other service processors over the service processor network (506). This message includes the first identifier for its service processor, and alternatively also the second identifier for each object residing on the service processor. That is, the message identifies all the objects representing hardware on the same node of which the service processor is a part. Each service processor can also receive the messages broadcast from the other service processors over the network (508). Each of these messages, too, includes the first identifier and alternatively also the second identifier for each object residing on the service processor from which the message was received. Maintenance of the object map can specifically be performed by each service processor storing the first and the second identifiers for each object residing on itself in its object map (510).

The discovery process outlined in FIG. 5 is a broadcast-type process, in which each service processor broadcasts a message to all other service processors. However, alternatively, the discovery process may be a multicast-type process, in which the service processors are segmented into two or more different groups. Each group may have associated therewith a specific multicast address. The service processors in a group broadcast their messages at this address, such that only the other service processors in the group listen for these messages. In this way, each service processor sends a message only to the other service processor in the same group. The discovery process outlined in FIG. 5 can be considered a multicast-type process where the service processors to which the messages are sent are only those service processors within a single group of service processors.

Embodiments of the invention can also incorporate a pre-discovery process not specifically outlined in FIG. 5. In pre-discovery, each service processor randomly generates a network address, such as an Internet Protocol (IP) address, within a given range, and sends a low-level message to the other devices on the network to ensure that the selected address has not already been taken by another device. If it has, the device with the same address sends a message back to the service processor, which generates another address and again sends a message. This process is repeated until the service processor has selected a unique network address.

Communication Between the Operating System and the Service Processors

Figure 8:
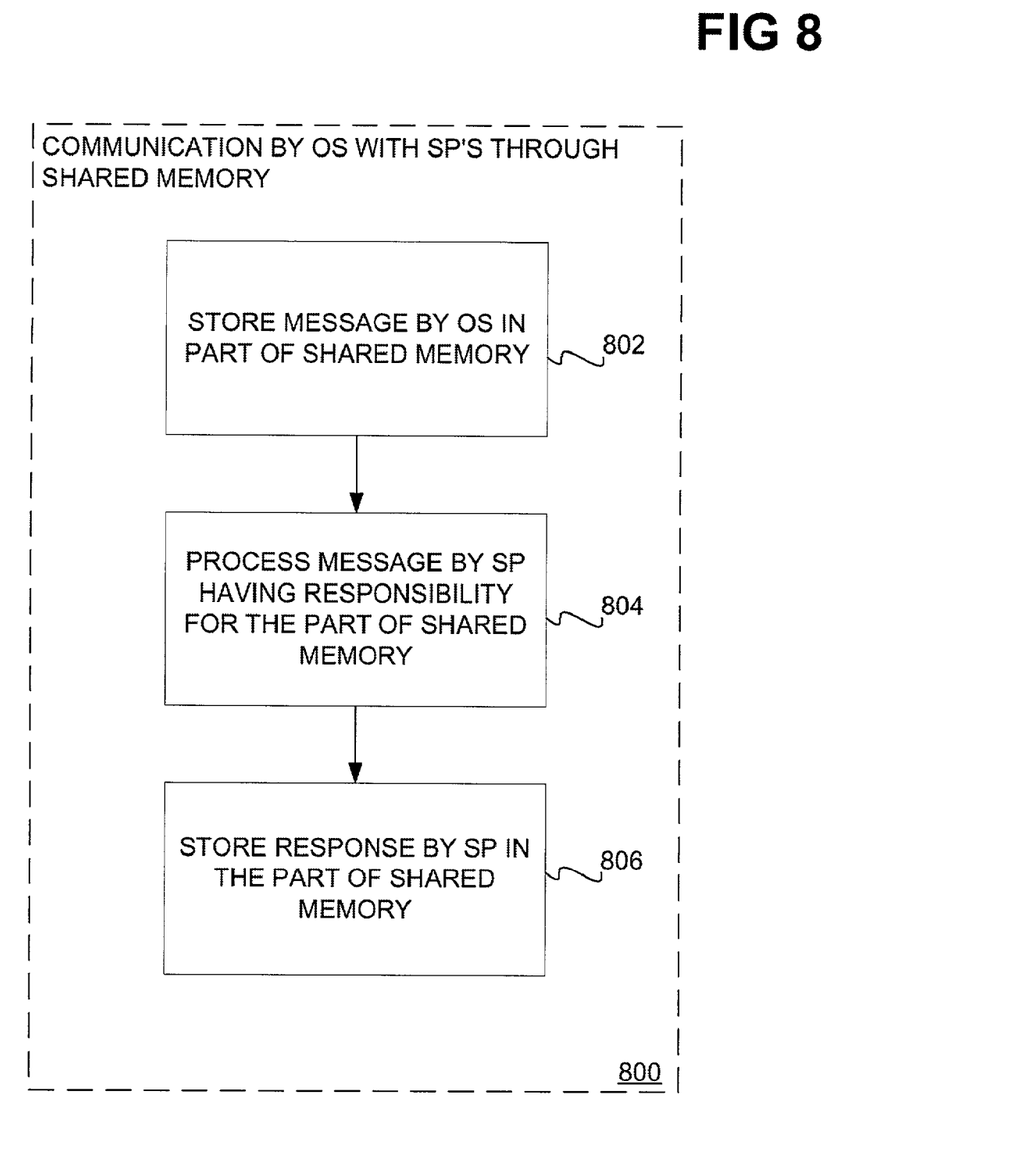
FIG. 8 is a flowchart of a method showing how an operating system can communicate with self-clustered service processors, according to an embodiment of the invention.

FIG. 8 shows a method 800 of an embodiment by which communication between an operating system (OS) and a cluster of service processors is accomplished. The operating system is an example of a type of software code. Other types of software code include firmware, for instance. The method 800 can be implemented in conjunction with the systems 100 and 400 of FIGS. 1 and 4, respectively. The method 800 can also be implemented in conjunction with an article of manufacture having a computer-readable signal-bearing medium, such as a recordable data storage medium.

The OS communicates with the cluster of service processors through a memory shared by all the service processors, such that the OS is preferably unaware which of the service processors performs a given function. First, the OS stores a message in a part of the shared memory allocated for a given type of messages (802). The service processor that has responsibility for this part of the shared memory, such that it is responsible for performing the functionality associated with the type of messages for which this part of the memory is allocated, processes the message (804). The service processor may, for instance, send data stored in the message over the service processor network 204 to the console 108. The service processor then stores a response in the part of the shared memory (806), so that the OS is aware that the message has been properly processed.

Figure 9:
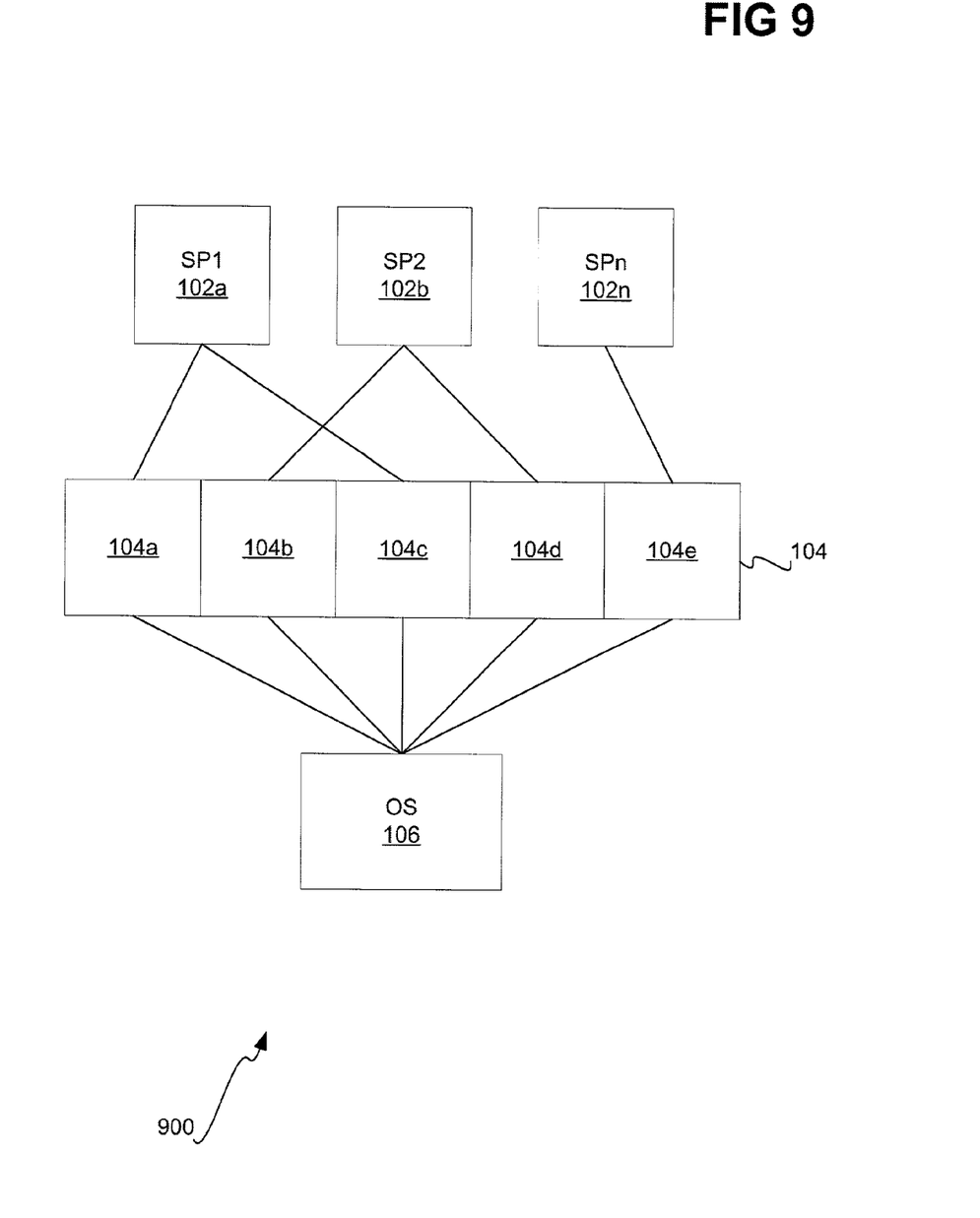
FIG. 9 is a diagram showing an example system in which a memory shared by a number of service processors has been divided into different parts, or channels, where each service processor is responsible for a subset of these channels.

FIG. 9 shows diagrammatically an example system 900 in which the shared memory 104 has been divided into parts 104a, 104b, 104c, 104d, and 104e. The service processor 102a is responsible for monitoring the parts 104a and 104c for messages from the OS 106. That is, the service processor 102a is responsible for processing, or handling, the messages stored in the parts 104a and 104c by the OS 106. Similarly, the service processor 102b is responsible for messages stored by the OS 106 in the parts 104b and 104d, and the service processor 102n is responsible for messages stored by the OS 106 in the part 104e. The parts 104a, 104b, 104c, 104d, and 104e into which the memory 104 has been divided can be referred to as channels, such that each of the service processors 102a, 102b, . . . , 102n is responsible for a specific subset of these channels at different points in time.

The messages stored in the different parts of the memory 104, and thus the channels into which the memory 104 has been divided, may be of different types. For example, a billboard type represents a generic memory data structure in which data is stored in the channel. A flow-controlled type represents a flow-controlled data structure in which the order of processing of the data is specified. A first-in-first-out (FIFO) type represents a FIFO-queuing data structure in which the first data stored is the first data processed. As a final example, an interrupt type represents a hardware feature which may be manipulated according to instructions stored in a data structure, to alert a service processor that a given event has occurred, such as work has arrived, such that particular actions may have to be performed.

Because each of the service processors 102a, 102b, . . . , 102n is responsible for a specific subset of the channels at different points in time, it is said that the channels are dynamically allocated among the service processors. Dynamic allocation of the channels among the service processors in particular allows for failover and load balancing among the service processors. For example, if one channel is receiving an inordinate amount of traffic, the other channels handled by the same responsible service processor may be dynamically allocated to other service processors, for load-balancing purposes. As another example, if a service processor fails, the channels for which it is responsible may be dynamically allocated to other service processors, for failover purposes.

Communication Between the Console and the Service Processors

Figure 10:
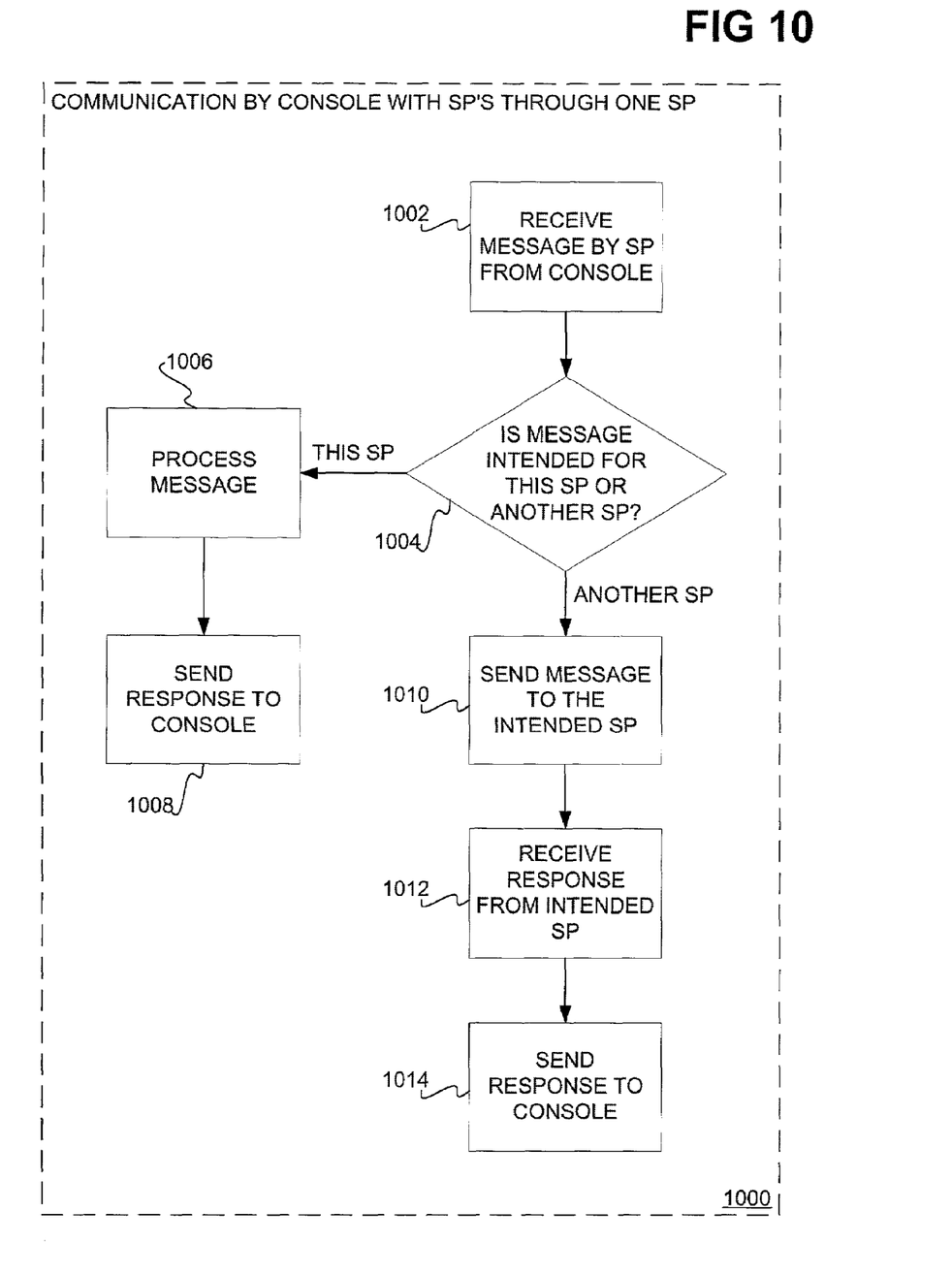
FIG. 10 is a flowchart of a method showing how a management console can communicate with self-clustered service processors, according to an embodiment of the invention.

FIG. 10 shows a method 1000 of an embodiment by which communication between a management console and a cluster of service processors is accomplished. The method 1000 can be implemented in conjunction with the systems 100 and 300 of FIGS. 1 and 3, respectively. The method 1000 can also be implemented in conjunction with an article of manufacture having a computer-readable signal-bearing medium, such as a recordable data storage medium.

The console communicates with the cluster of service processors through any one of the service processors of a cluster, such that the console is preferably unaware that the service processors have been clustered to perform functionality for the console. This service processor first receives a message from the console (1002), and determines whether the message is intended for itself or another service processor within the cluster (1004). For instance, the message may relate to hardware that is stored in the same node as the service processor, or in the same node as another service processor. As another example, the message may relate to a function for which the service processor is responsible, or for which another service processor is responsible.

If the message is intended for the service processor that received the message, then this service processor processes the message appropriately (1006), and sends a response back to the console (1008). However, if the message is intended for a different service processor, the service processor that received the message sends, or routes, the message to this other service processor (1010), which itself processes the message. The service processor that received the message then receives a response from this other service processor (1012), which it routes back to the console (1014).

Other types of routing can also be accomplished of messages among service processors and the console, in addition to or in lieu of that shown specifically shown in FIG. 10. For example, if the service processor that receives a request from the console is not the intended service processor, it may route the message to the intended service processor, which directly sends a reply back to the console instead of routing the reply back to the service processor that had received the request. As another example, the console may send messages to specific service processors that it believes is responsible for processing such types of messages, which may be accomplished for performance, optimization, load balancing, and other purposes.

Furthermore, the console can become aware of a given object representing specific hardware on a specific service processor in a number of different ways not limited by the invention itself. The console may, for instance, ask for enumeration of the objects from the service processor it knows. For example, one of the service processors may maintain what is referred to as a service processor type root class node, which has the specific service processor instances as first-level children nodes. The children nodes of these first-level children nodes are second-level children nodes maintained by the individual service processors themselves, which can be directly queried for the enumeration of the second-level children nodes. The second-level children nodes may correspond to, for instance, the objects representing the hardware on a given service processor.

Advantages Over the Prior Art

Embodiments of the invention allow for advantages over the prior art. The service processors of the nodes of a system aggregate themselves in a cluster, such that the operating system (OS) and the management console do not have added overhead responsibilities. That is, the service processors are clustered without assistance from a controller, host, master service processor, or other entity. This means that the OS and the console are not themselves required to perform service processor cluster management duties.

Because the OS places messages in different channels of memory shared among all the service processors, the OS is preferably unaware which of the service processors actually handles a given type of message. The OS thus does not have to track which service processors handle which types of messages, and, significantly, does not have to concern itself with load balancing and failover among the service processors. Similarly, the console communicates with the cluster of service processors through a given service processor, and thus is preferably unaware that the cluster is performing functionality for the console. The console also does not have to track which service processors handle which types of messages, and does not have to concern itself with load balancing and failover.

In addition, embodiments of the invention can be performed within the firmware of the service processor, avoiding modification of the OS to ensure compatibility. This means that significant coding effort is avoided to implement the invention in such embodiments, because the different types of operating systems that may be used do not have to be modified in order to implement the invention, since the invention is implemented in service processor firmware. Such service processor firmware implementation also increases behavioral consistency of service processor functionality from OS to OS.

GENERIC ALTERNATIVE EMBODIMENT

Figure 11:
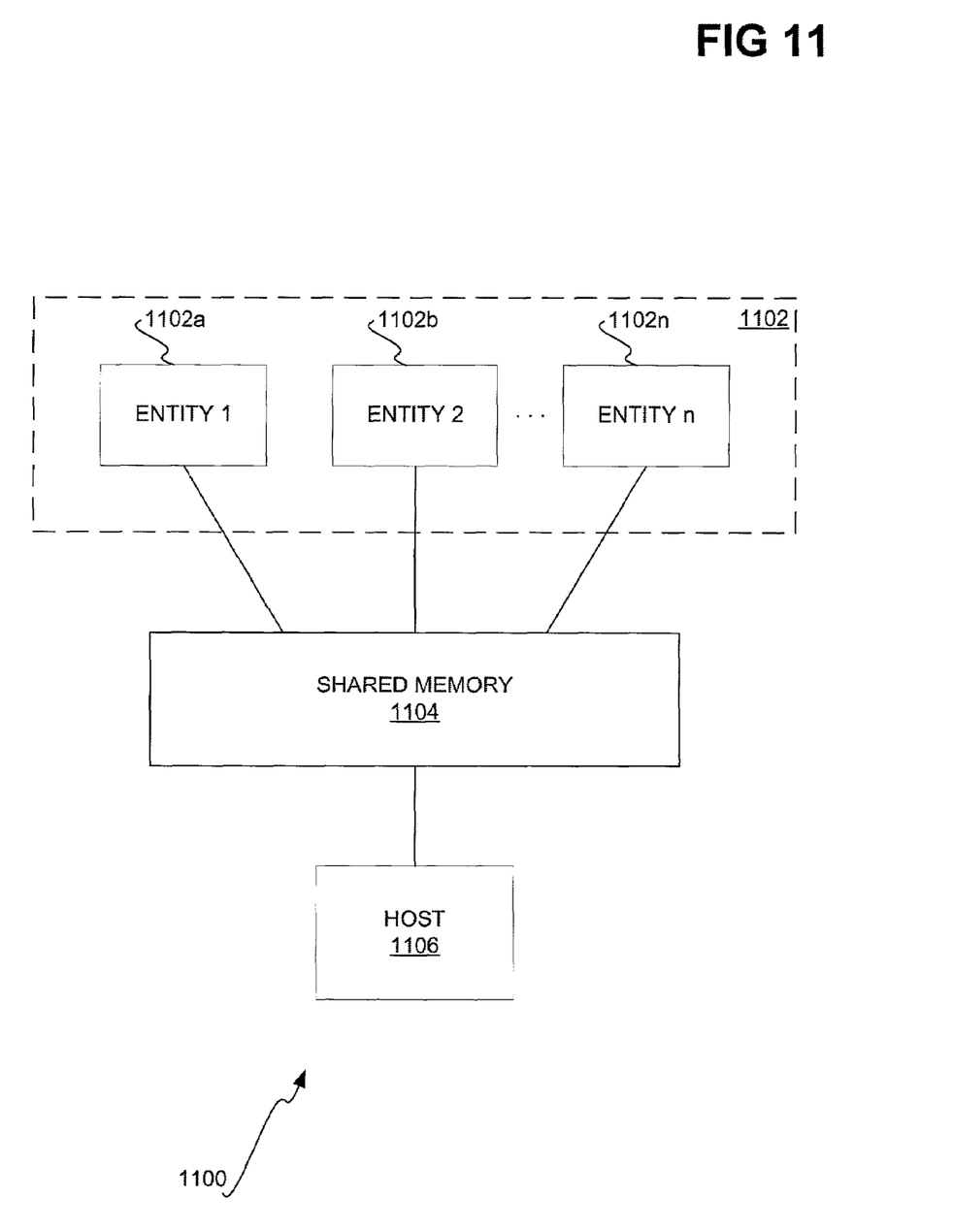
FIG. 11 is a diagram of a system according to a more general embodiment of the invention in which a host communicates with self-clustered entities through a shared memory.

Aspects of the invention are applicable in other contexts besides an operating system (OS) communicating with a self-aggregated cluster of service processors through a memory shared by all the service processors. FIG. 11 shows a system 1100 that is a generalization of the systems 100 and 400 of FIGS. 1 and 4, respectively. The entities 1102a, 1102b, ..., 1102n self-aggregate into a cluster 1102. For example, the entities may be service processors in the embodiment of the invention described in the previous sections of the detailed description. The host 1106 communicates with the cluster 1102 through a shared memory 1104. For example, the host 1106 may be an OS in the embodiment of the invention described in the previous sections of the detailed description. Furthermore, the hardware that has been described as that for which service processors are responsible in the embodiment described in the previous sections of the detailed description is one type of resource.

The shared memory 1104 is allocated into different parts, or channels, one or more of which each of the entities 1102a, 1102b, ..., 1102n monitors for messages from the host 1106 for processing. Thus, communication between the host 1106 and the cluster 1102 can be accomplished as has been more particularly described in conjunction with the method 800 of FIG. 8, which is specific to the host 1106 being an OS and the entities 1102a, 1102b, ..., 1102n being service processors. Otherwise, however, the method 800 of FIG. 8 is applicable to the system 1100 as well.

As an example, the entities 1102a, 1102b, ..., 1102n may be network adapters each having a given bandwidth, and which can self-discover one another to form the cluster 1102. The bandwidth constituting the resource on the network adapters. The host 1106 may be an OS that sends data over the cluster 1102 through the shared memory 1104. In this way, the OS does not have to be reconfigured to support multiple network adapters, but rather treats the cluster 1102 as a single, high-bandwidth network adapter. The adapters themselves handle failover, load balancing, and connection routing among the network adapters, such that the OS does not have to take on additional overhead for such functionality.

As another example, clustering of mass storage controllers may be performed, to allow a common queue of read/write/verify commands to be executed by any storage controller with access to the data. This is referred to as self-aggregating RAID. The number and type of storage controllers can vary, as well as which of them handles a particular region of clusters. The resources in this case are the storage devices, such as hard disk drives or other mass storage devices, managed by the mass storage controllers. Furthermore, the controllers may, for example, dynamically enable extra redundancy by initiating mirroring to unallocated storage, which is known as RAID-1, or initiating striping for regions experiencing large reads/writes, which is known as RAID-0. Another example is a cluster of coprocessors, such as floating point, vector, graphics, or other types of processors, which can result in high resource utilization with low overhead.

OTHER ALTERNATIVE EMBODIMENTS

It will be appreciated that, although specific embodiments of the invention have been described herein for purposes of illustration, various modifications may be made without departing from the spirit and scope of the invention. For example, whereas four different types of messages that can be communicated between the operating system (OS) and the cluster of service processors have been described, other types of messages can also be communicated between the OS and the cluster. As another example, the first identifier has been described as the Ethernet address of a service processor. However, other types and combinations of identifiers can also be used as the first identifier.

As another example, discovery of cluster peers can be accomplished by multicasting rather than broadcasting. The role ascribed to the OS can also be performed by other software code executing on the host, such as host firmware, a driver, a diagnostic program, and so on. Furthermore, the OS and/or the console may be aware of which service processor in the cluster is responsible for processing their requests, even though the invention has been substantially described as the OS and the console being unaware of which service processor is so responsible.

In addition, whereas the invention has been substantially described as pertaining to a shared memory, it is also applicable to other types of shared resources, such as computer-readable media like hard disk drives and other storage media. Finally, whereas the invention has been substantially described as to a memory shared by all the service processors, a particular portion of the memory may only be shared by a subset of all the service processors. Accordingly, the scope of protection of this invention is limited only by the following claims and their equivalents.

We claim:

1. A method comprising:
    self-discovering, at each of a plurality of service processors of a system, all other of the service processors to self-aggregate the service processors to form a cluster in that the service processors aggregate themselves, without assistance, to form the cluster;
    maintaining, at each service processor within the cluster, an object map representing hardware of the system for which the service processor is responsible as objects, each object uniquely identified by a first identifier corresponding to the service processor on which the object resides and a second identifier to distinguish the object from other of the objects also residing on the service processor; and,
    communicating by software code stored on a tangible computer-readable medium, such that the software code is unaware which of the service processors performs a given function.

2. The method of claim 1, wherein self-discovering, at each of the plurality of service processors of the system, all other of the service processors, comprises:
    sending a message to all other of the service processors, the message including the first identifier of the object corresponding to the service processor from which the message was sent; and,
    receiving a message from each of all other of the service processors, each message including the first identifier of the object corresponding to the service processor from which the message was received.

3. The method of claim 1, further comprising communicating by a console with the cluster through a particular service processor of the cluster, the console being aware of just the particular service processor and is unaware of all other of the plurality of service processors of the cluster, such that the console is unaware that the service processors have been clustered to perform functionality for the console.

4. The method of claim 1, wherein the first identifier comprises an identifier unique to the service processor, and the second identifier comprises at least an object instance number.

5. The method of claim 1, wherein the plurality of service processors are one of a plurality of groups of service processors of the system.

6. A method comprising:
    self-aggregating a plurality of service processors together to form a cluster, in that the service processors aggregate themselves, without assistance, to form the cluster, via self-discovery at each service processor of all other of the service processors;
    maintaining at each service processor an object map representing hardware of the system for which the service processor is responsible as objects, each object uniquely identified by a first identifier corresponding to the service processor on which the object resides and a second identifier to distinguish the object from other of the objects also residing on the service processor; and,
    communicating by software code stored on a tangible computer-readable medium with the cluster such that the software code is unaware which of the service processors performs a given function.

7. The method of claim 6, wherein communicating by the software code with the cluster comprises communicating with the cluster through a memory shared by all the service processors.

8. A method comprising:
    self-aggregating a plurality of service processors together to form a cluster, in that the service processors aggregate themselves, without assistance, to form the cluster, via self-discovery at each service processor of all other of the service processors;
    maintaining at each service processor an object map representing hardware of the system for which the service processor is responsible as objects, each object uniquely identified by a first identifier corresponding to the service processor on which the object resides and a second identifier to distinguish the object from other of the objects also residing on the service processor; and,
    communicating by software code stored on a tangible computer-readable medium with the cluster through a memory shared by all the service processors such that the software code is unaware which of the service processors performs a given function.

9. The method of claim 8, wherein communicating by the software code with the cluster comprises:
    storing a message by the software code at a part of the memory shared by all the service processors;
    processing the message by one of the service processors having responsibility for the part of the memory shared by all the service processors; and,
    storing a response by the one of the service processors at the part of the memory shared by all the service processors.

10. A method comprising:
    self-aggregating a plurality of service processors together to form a cluster, in that the service processors aggregate themselves, without assistance, to form the cluster, via self-discovery at each service processor of all other of the service processors;
    maintaining at each service processor an object map representing hardware of the system for which the service processor is responsible as objects, each object uniquely identified by a first identifier corresponding to the service processor on which the object resides and a second identifier to distinguish the object from other of the objects also residing on the service processor; and,
    communicating by a console with the cluster through any one service processor of the cluster, the console being aware of just the particular service processor and is unaware of all other of the plurality of service processors of the cluster, such that the console is unaware that the service processors have been clustered to perform functionality for the console.

11. The method of claim 10, wherein communicating by the console with the cluster comprises, at the one service processor:
    receiving a message from the console; and,
    in response to determining that the message is intended for the one service processor, processing the message and replying to the console.

12. The method of claim 11, wherein determining that the message is intended for the one service processor comprises determining that the message relates to hardware represented by an object having a first identifier corresponding to the one service processor.

13. The method of claim 11, wherein communicating by the console with the cluster further comprises, at the one service processor, in response to determining that the message is intended for another service processor sending the message to the other service processor.

14. The method of claim 13, wherein determining that the message is intended for the other service processor comprises determining that the message relates to hardware represented by an object having a first identifier corresponding to the other service processor.

* * * * *